United States Patent [19]

Granger

[11] 4,329,963
[45] May 18, 1982

[54] AIR-FUEL CHARGE HEATER AND HUMIDIFIER

[76] Inventor: Charles C. Granger, 1203 Chestnut St., Henderson, N.C. 27536

[21] Appl. No.: 104,172

[22] Filed: Dec. 17, 1979

[51] Int. Cl.$^3$ ............................................. F02M 31/00
[52] U.S. Cl. ..................................... 123/552; 123/549; 123/546; 123/25 P; 261/144; 261/142
[58] Field of Search ....................... 123/549, 546, 25 P, 123/25 D, 25 B, 552; 261/142, 144, 145

[56] References Cited

U.S. PATENT DOCUMENTS

| | | | |
|---|---|---|---|
| 1,319,718 | 10/1919 | Martin | 123/557 |
| 1,630,048 | 5/1927 | Balachowsky | 123/546 |
| 4,016,847 | 4/1977 | Rychlik | 123/546 |
| 4,100,899 | 7/1978 | Chilton | 123/546 |
| 4,106,457 | 8/1978 | Toffen | 123/546 |

Primary Examiner—Ronald H. Lazarus
Attorney, Agent, or Firm—Harvey B. Jacobson

[57] ABSTRACT

A liquid vaporizing attachment is provided for a combustion engine including an air and fuel charge forming device defining an air and fuel passage extending therethrough, an induction passage inlet end for receiving an air and fuel charge from the charge forming device and an engine exhaust system. The attachment defines an intermediate passage extending therethrough including inlet and outlet ends communicated with the outlet end of the air and fuel passage and the induction passage inlet end, respectively. The intermediate passage includes heating structure operatively associated therewith for heating fluid flowing therethrough and liquid vapor injection structure for injecting a heated liquid vapor into the intermediate passage. The intermediate passage includes a horizontal major length portion thereof and upwardly and downwardly opening inlet and outlet end portions, respectively, defining the inlet and outlet ends of the intermediate passage. In addition, the intermediate passage defines a main passage and a bypassage for bypassing the central portion of the main passage. The heating structure includes first heating structure in the intermediate portion of the main passage and second heating structure in the bypass passage, the intermediate portion of the main passage including structure for selectively opening and closing the intermediate portion of the main passage to the flow of fluid therethrough.

5 Claims, 6 Drawing Figures

AIR-FUEL CHARGE HEATER AND HUMIDIFIER

BACKGROUND OF THE INVENTION

The recent emphasis on reduction of automotive exhaust pollutants and automotive engine economical fuel consumption has created a serious need for an attachment for conventional forms of vehicle internal combustion engines which may be utilized to reduce exhaust pollutants and to decrease fuel consumption.

Various forms of air and fuel charge heating and vaporizing attachments designed specifically to accomplish these functions have been heretofore designed. Examples of various forms of these attachments, including some of the general structural and operational features of the instant invention, are disclosed in U.S. Pat. Nos. 1,657,010, 1,724,481, 2,314,131, 2,873,349, 3,987,772, 4,031,875 and 4,050,419. However, these various forms of attachments have either been complicated in structure including various controlling structures subject to malfunction or have proven to be ineffective in at least some aspects of their operation. Accordingly, a need exists for an improved form of air and fuel charge heating and humidifying attachment which may be readily utilized in conjunction with existing automotive internal combustion engines and which may also be readily incorporated into the manufacture of new internal combustion engine powered vehicles.

BRIEF DESCRIPTION OF THE INVENTION

The air and fuel charge heating and humidifying attachment of the instant invention is constructed in a manner whereby the air and fuel charge supplied to an internal combustion engine may be adequately heated, even on initial starting of the engine, in order to insure economical operation. In addition, the attachment is further constructed in a manner whereby subsequent to starting of the associated engine a supply of vaporized water or other liquid may be supplied to the air and fuel induction passages of the engine for increasing the efficiency of operation thereof and reducing the fuel consumed by the engine.

The main object of this invention is to provide an air and fuel charge heating and humidifying attachment which will be capable of affording more economical and exhaust pollution-free operation of an internal combustion engine.

Another object of this invention is to provide an attachment which may be readily operatively connected to an existing internal combustion engine.

Still another object of this invention is to provide an attachment which may be utilized to quickly heat the air and fuel charge supplied to an internal combustion engine upon initial starting of the engine and which will also be capable of maintaining the air and fuel charge supplied to the engine heated after initial warm-up of the engine.

Another very important object of this invention is to provide an attachment constructed in a manner whereby initial heating may be accomplished by electrical resistance heating structure and subsequent heating may be accomplished by the heat of exhaust gases being discharged from the engine.

A final object of this invention to be specifically enumerated herein is to provide an air and fuel charge heating and humidifying apparatus in accordance with the preceding objects and which will conform to conventional forms of manufacture, be of simple construction and easy to use, so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE INVENTION

Figure 1:
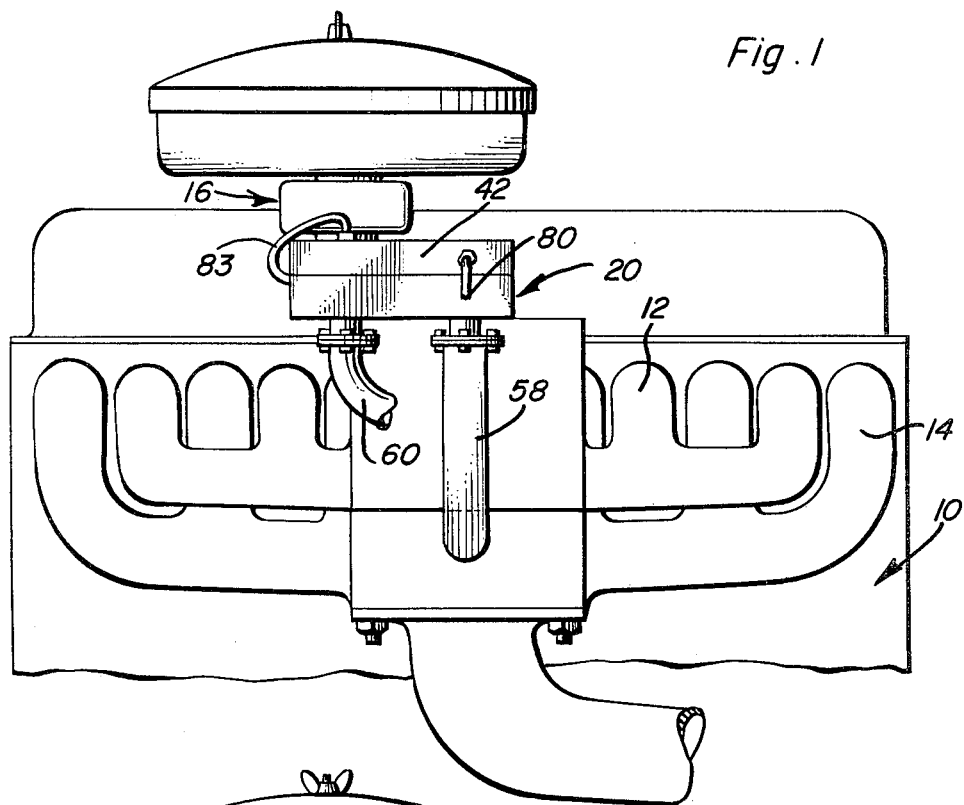
FIG. 1 is a fragmentary, side elevational view of a conventional form of in-line combustion engine typical of the type utilized in present day motor vehicles and with the air and fuel charge heating and humidifying structure of the instant invention operatively associated therewith.
Figure 2:
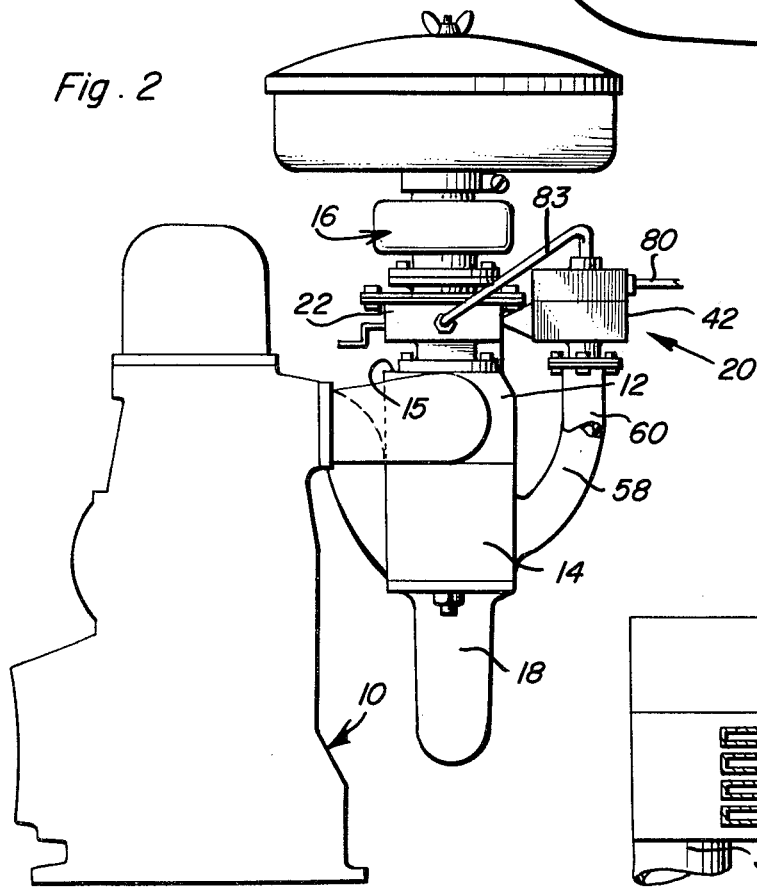
FIG. 2 is an end elevational view of the assemblage as seen from the left side of FIG. 1.
Figure 6:
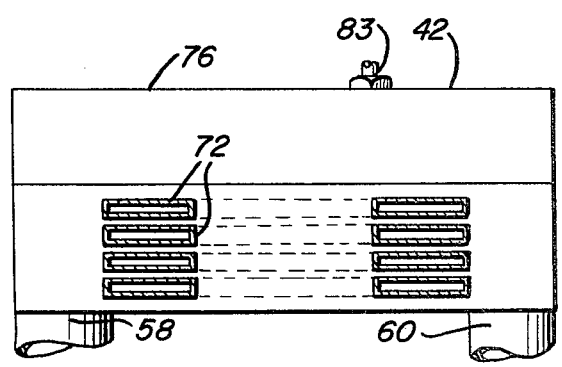
FIG. 6 is a fragmentary, vertical sectional view taken substantially upon the plane indicated by the section line 6—6 of FIG. 3 and on somewhat of a reduced scale.
Figure 3:
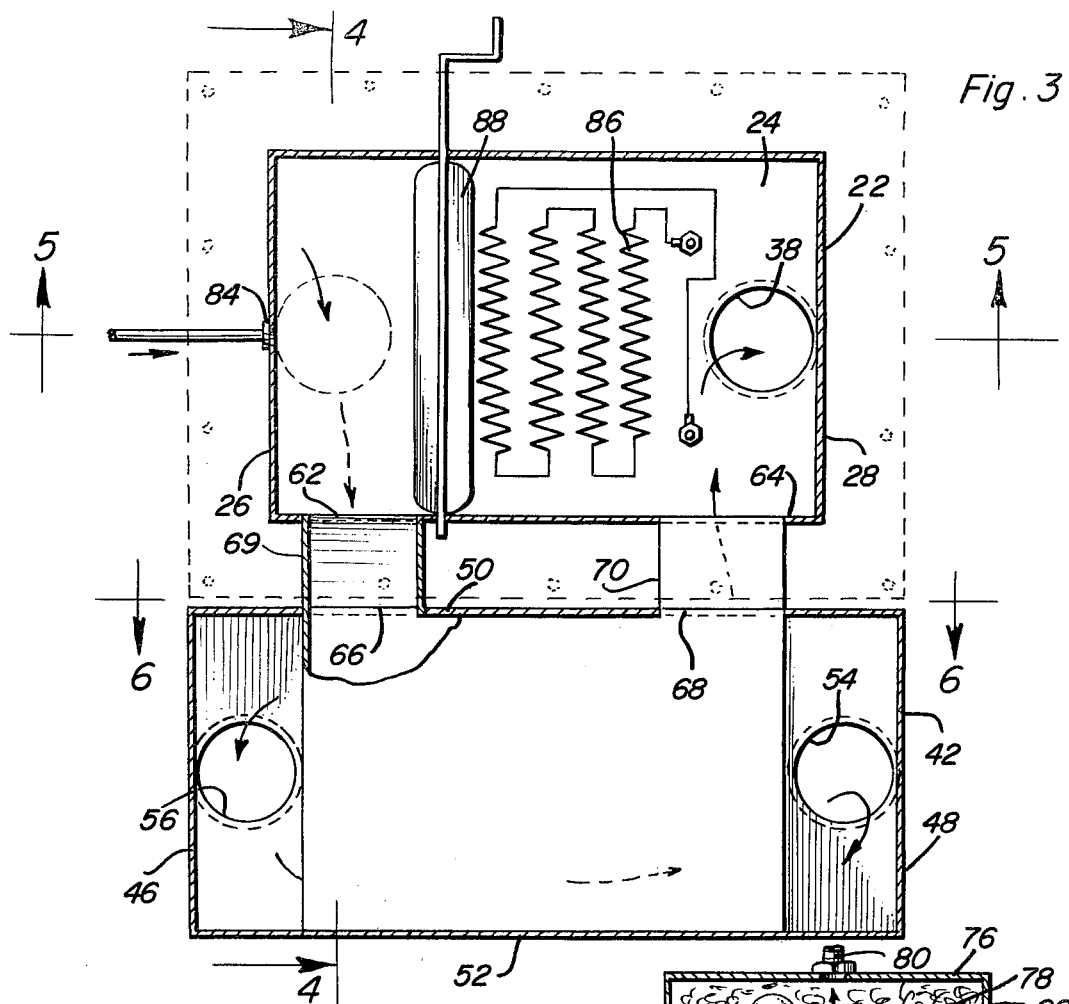
FIG. 3 is a fragmentary, enlarged, horizontal sectional view of the attachment.
Figure 4:
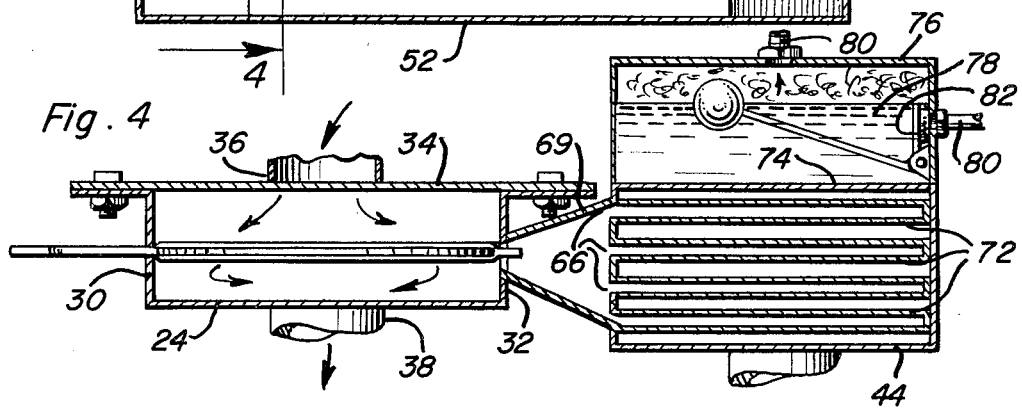
FIG. 4 is a fragmentary, transverse, vertical sectional view taken substantially upon the plane indicated by the section line 4—4 of FIG. 3.
Figure 5:
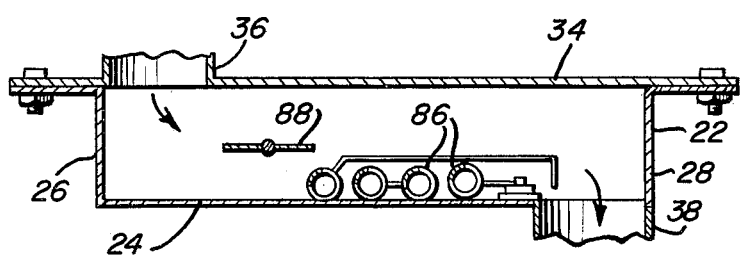
FIG. 5 is fragmentary, vertical sectional view taken substantially upon the plane indicated by the section line 5—5 of FIG. 3.

Referring now more specifically to the drawings, the numeral 10 generally designates a conventional form of motor vehicle engine, including an intake manifold 12 and an exhaust manifold 14. Conventionally, the intake manifold 12 includes a mounting flange portion 15 to which a conventional carburetor referred to in general by the reference numeral 16 is mounted and the exhaust manifold 14 has the inlet end of a header pipe 18 secured to the exhaust outlet thereof.

The attachment of the instant invention is referred to in general by the reference numeral 20 and includes a first housing portion 22 including a bottom wall 24, opposite end walls 26 and 28 and opposite side walls 30 and 32. The bottom wall 24 extends between and interconnects the lower marginal portions of the end walls 26 and 28 and the opposite side walls 30 and 32 and the open top of the housing portion 22 is closed by a removable top wall 34 having an inlet flanged upwardly opening inlet 36 at one end. The remote end of the bottom wall 24 includes a downwardly opening flanged outlet 38.

The interior of the first housing portion 22, the inlet 36 and the outlet 38 define an intermediate passage extending through the attachment 20 and the interior of the first housing portion defines a horizontal intermediate portion of the intermediate passage.

The attachment 20 also includes a second housing portion 42 including a bottom wall 44, opposite end walls 46 and 48 and opposite side walls 50 and 52. The bottom wall 44 extends between and interconnects the lower marginal portions of the end walls 46 and 48 and the side walls 50 and 52 and the opposite ends of the bottom wall 44 include downwardly opening inlet and outlet openings 54 and 56.

The exhaust manifold 14 includes a first supplemental exhaust pipe 58 extending from the manifold 14 to the inlet opening 54 and a second supplemental exhaust pipe 60 extending from the outlet opening 56 to a downstream portion (not shown) of the header pipe 18. Accordingly, exhaust gases may flow freely through the second housing portion 42.

The side wall 52 includes an outlet opening 62 formed in the inlet end of the first housing portion 22 and an outlet opening 64 formed in the outlet end of the housing portion 22. Also, the second housing portion 42 includes longitudinally spaced sets of vertically spaced slots 66 and 68 formed in the side wall 50 and tapered connecting pipe sections 69 and 70 communicate the slots 66 with the inlet opening 62 and the slots 68 with the outlet opening 64. Also, the interior of the second housing portion 42 includes vertically spaced horizontal tube sections 72 disposed therein into which corresponding slots 66 and 68 open.

The interior of the second housing portion 42 includes a horizontal baffle 74 spaced above the uppermost tube sections 72 and a top wall 76 which extends between and interconnects the upper marginal portions of the opposite end walls 46 and 48 and the opposite side walls 50 and 52, a boiler chamber 78 being defined between the baffle 74 and the top wall 76. A water supply line 80 opens into the interior of the boiler chamber 78 and the inlet end of the water supply line 80 may extend from any suitable supply (not shown) of water under slight pressure. The flow of water into the chamber 78 from the water supply line 80 is under the control of a float actuated valve 82 and the heat of exhaust gases passing through the lower portion of the interior of the second housing portion 42 below the baffle 74 functions to heat water within the chamber 78 and to transform that water into steam. A steam line 83 includes an inlet end opening downwardly into the upper portion of the boiler chamber 78 through the top wall 76 and an outlet end which opens into the interior of the first housing portion 22, as at 84.

The interior of the first housing portion 22 includes electrical resistance heating wires 86 which may be serially electrically connected in any suitable electrical circuit connected to a suitable source of electrical potential and a manually operable fluid flow valve 88 is disposed within the first housing portion 22 between the inlet 36 and the outlet 38.

The tube sections 72 and connecting pipe sections 69 and 70 define a bypass passage which bypasses the valve 88 and the electrical resistance heating wires 86.

When installing the attachment 20, the base of the carburetor is removed from the mounting flange portion 15 and the first housing portion 22 is interposed between the base of the carburetor 16 and the mounting flange portion 15 of the intake manifold 12. Conventional means may be utilized to mount the carburetor 16 on the top wall 34 of the first housing portion 22 with the air and fuel passage extending through the carburetor registered with the inlet 36. Also, the first housing portion 22 may be secured by conventional methods to the mounting flange portion 15 of the intake manifold 12 with the outlet 38 registered with the inlet of the induction passage (not shown) formed in the intake manifold 12. In operation, before the engine 10 is initially started, the electrical resistance heating wires 86 are actuated and the valve 88 is moved to the open position. After a predetermined time interval in order to allow the heating wires 86 to be fully heated, the engine 10 is started and the air and fuel mixture being discharged from the carburetor 16 enters the first housing portion 22 through the inlet 36 and passes the open valve 88 and is warmed by the electrical resistance heating wires 86 before being discharged from the first housing portion 22 through the outlet 38 and into the interior of the intake manifold 12. However, soon after the engine 10 is started, the heat of engine exhaust passing through the lower portion of the interior of the second housing portion 42 below the baffle 74 will cause the tube sections 72 to be heated. After the tube sections 72 have been heated as a result of a short period of initial operation of the engine 10, the electrical heating wires 86 may be deactivated and the valve 88 may be closed whereby the air and fuel charge passing through the first housing portion 22 will be caused to pass through the bypass passage defined by the tube sections 72 and the connecting pipe sections 69 and 70. Of course, the air and fuel charge will be heated by the tube sections 72 and pass back into the first housing portion 22 and outwardly therefrom through the outlet 38.

After further initial operation of the engine 10, the heat of exhaust gases below the baffle 74 will cause the water within the boiler chamber 78 to be heated and to be transformed into steam. This steam will be ducted through the pipe 83 and into the inlet end of the first housing portion 22 for mixing with the air and fuel charge passing through the bypass passage. Of course, the steam or water vapor discharged into the first housing portion will be further heated during passage of the air, fuel and steam mixture through the bypass passage defined in part by the tube sections 72. Thus, after a short period of operation of the engine 10, the attachment 20 is operative to supply a fully heated charge of air, fuel and water vapor to the induction passages of the intake manifold 12.

The float control valve 82 controls the flow of water into the boiler chamber 78 and the water supply for the water supply line 80 may comprise a water reservoir (not shown) at an elevation slightly higher than the boiler chamber 78. In this manner, an adequate supply of water within the boiler chamber will be maintained at all times.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In combination with a combustion engine including an air and fuel charge forming device defining an air and fuel passage therethrough, an induction passage inlet end for receiving an air and fuel charge from said charge forming device and an engine exhaust system, a liquid vaporizing attachment, said attachment defining an intermediate passage extending therethrough including inlet and outlet ends communicated with the outlet end of said air and fuel passage and said induction passage inlet end, respectively, and an intermediate portion extending between said inlet and outlet ends of said intermediate passage, said intermediate portion including selectively operable electrical resistance heating means disposed therein for heating the fluid flow therethrough, and selectively operable valve means for variably throttling the flow of fluid through said intermediate portion, means defining a bypass passage including inlet and outlet ends opening into said inlet and outlet ends of said intermediate passage and bypassing the intermediate portion of said intermediate passage, and exhaust gas heated heat exchange means operatively associated with said bypass passage intermediate the inlet and outlet ends thereof for heating the flow of fluid therethrough; whereby selective operation of said valve means enables heating of an air and fuel charge during initial engine operation by said heating means in said intermediate portion of said intermediate passage, subsequent heating of said charge by said heat exchange means in said bypass passage after initial engine warm-up and deactivation of said heating means, and subsequent prevention of overheating of said charge after engine warm up and during periods of higher ambient temperature by decreasing and increasing the portion of said charge flowing through said bypass passage and intermediate portion of said intermediate passage, respectively.

2. The combination of claim 1 wherein said intermediate passage includes liquid vapor injection means operably associated therewith for injecting a heated liquid vapor into the inlet end of said intermediate passage.

3. The combination of claim 1 wherein said intermediate passage includes a horizontal major length portion and upwardly and downwardly opening inlet and outlet end portions, respectively, defining said inlet and outlet ends.

4. The combination of claim 2 wherein said liquid vapor injection means includes an exhaust gas steam generator.

5. The combination of claim 1 wherein said exhaust gas heated heat exchange means includes enlongated exhaust gas flow passage means and air and fuel charge passage means disposed in good heat transfer relation with each other and through which exhaust gases and the air and fuel charge flow in opposite directions.

* * * * *